(12) United States Patent
Choo (10) Patent No.: US 9,445,384 B2
(45) Date of Patent: Sep. 13, 2016

(54) MOBILE DEVICE TO GENERATE MULTIPLE MAXIMUM TRANSFER UNITS AND DATA TRANSFER METHOD

(71) Applicant: PANTECH CO., LTD., Seoul (KR)

(72) Inventor: Ho Cheol Choo, Seoul (KR)

(73) Assignee: Pantech Co., Ltd., Seoul (KR)

( * ) Notice: Subject to any disclaimer, the term of this patent is extended or adjusted under 35 U.S.C. 154(b) by 789 days.

(21) Appl. No.: 13/676,202

(22) Filed: Nov. 14, 2012

(65) Prior Publication Data

US 2013/0223337 A1 Aug. 29, 2013

(30) Foreign Application Priority Data

Feb. 29, 2012 (KR) .................. 10-2012-0021499

(51) Int. Cl.
*H04L 12/805* (2013.01)
*H04W 60/00* (2009.01)
*H04L 12/54* (2013.01)
*H04W 48/16* (2009.01)

(52) U.S. Cl.
CPC .............. *H04W 60/00* (2013.01); *H04L 47/36* (2013.01); *H04L 12/56* (2013.01); *H04W 48/16* (2013.01)

(58) Field of Classification Search
None
See application file for complete search history.

(56) References Cited

U.S. PATENT DOCUMENTS

| | | | |
|---|---|---|---|
| 8,848,608 B1* | 9/2014 | Addepalli | H04W 4/046 370/328 |
| 2005/0041635 A1* | 2/2005 | Chung et al. | 370/351 |
| 2006/0262732 A1* | 11/2006 | Joutsenvirta et al. | 370/254 |
| 2007/0192434 A1* | 8/2007 | Kodama | H04L 29/12377 709/218 |
| 2010/0039989 A1* | 2/2010 | Hong et al. | 370/328 |
| 2011/0051689 A1* | 3/2011 | Premec et al. | 370/331 |
| 2011/0202983 A1* | 8/2011 | Pope | G06F 21/572 726/7 |
| 2011/0321039 A1* | 12/2011 | De Leon, III | H04L 12/4641 718/1 |

FOREIGN PATENT DOCUMENTS

KR 10-0721339 5/2007
WO 2009/127681 10/2009

* cited by examiner

*Primary Examiner* — Kodzovi Acolatse
(74) *Attorney, Agent, or Firm* — H.C. Park & Associates, PLC (57) ABSTRACT

Provided are a mobile device capable of generating multiple maximum transfer units (MTUs) and a data transfer method. The method includes determining whether a network is registered with the mobile device; if the network is not registered in the mobile device, generating a virtual interface to generate a maximum transfer unit (MTU) value of the network; and registering the network by storing the MTU value of the network in the mobile device. The mobile device includes an MTU management unit configured to determine whether a network is registered with the mobile device, and, if the network is not registered in the mobile device, to generate a virtual interface to generate an MTU value of the network.

19 Claims, 7 Drawing Sheets

MOBILE DEVICE TO GENERATE MULTIPLE MAXIMUM TRANSFER UNITS AND DATA TRANSFER METHOD

CROSS-REFERENCE TO RELATED APPLICATION

This application claims priority to and the benefit under 35 U.S.C. §119 of Korean Patent Application No. 10-2012-0021499, filed on Feb. 29, 2012, the entire content of which is incorporated herein by reference.

BACKGROUND

1. Field

Aspects of the present invention relate to a mobile device creating multiple maximum transfer units (MTUs) and a data transferring method using the same.

2. Description of the Background

In a mobile device network structure, a network interface creates a maximum transfer unit (MTU) and constructs a data packet having a size corresponding to MTU to transfer data. However, when multiple networks are connected to the mobile device, the created MTU depends on the multiple networks. Therefore, if the data packet size is larger than the MTU, it is necessary to perform fragmentation. However, if a data packet cannot be intrinsically fragmented, data transfer may not be achieved. In addition, if the MTU is determined by a network having the smallest MTU value among the multiple networks, the data packet size is restricted by that smallest MTU value, and data transferring efficiency may be reduced.

SUMMARY

Exemplary embodiments of the present invention provide a mobile device that generates multiple maximum transfer units (MTUs) and a data transferring method using the same.

Additional features of the invention will be set forth in the description which follows, and in part will be apparent from the description, or may be learned by practice of the invention.

Exemplary embodiments of the present invention provide a method for transferring data for a mobile device, the method including determining whether a network is registered with the mobile device; if the network is not registered in the mobile device, generating a virtual interface to generate a maximum transfer unit (MTU) value of the network; and registering the network by storing the MTU value of the network in the mobile device, Exemplary embodiments of the present invention provide a mobile device including a maximum transfer unit (MTU) management unit configured to determine whether a network is registered with the mobile device, and, if the network is not registered in the mobile device, to generate a virtual interface to generate an MTU value of the network.

Exemplary embodiments of the present invention provide a method for transferring data for a mobile device, the method including, in response to a connection of a network to the mobile device, determining whether the network is registered in a routing table; if the network is registered in the routing table, determining whether a stored MTU value of the registered network is different from a current MTU value of the registered network; and if the current MTU value of the registered network is different from the stored MTU value of the network, generating a virtual interface to generate an MTU value of the registered network, and registering the network by storing the generated MTU value in the routing table.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. It will be understood that for the purposes of this disclosure, "at least one of" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, XZZ, YZ, XX).

Figure 1:
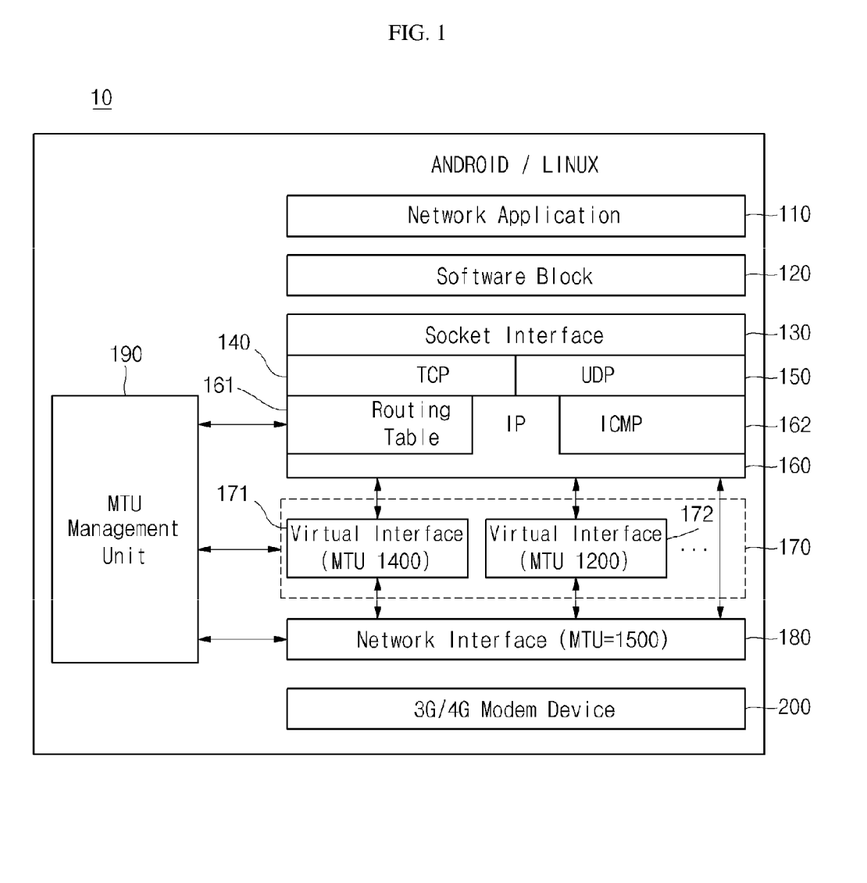
FIG. 1 illustrates a network protocol hierarchy structure of a mobile device according to an embodiment of the present invention.

FIG. 1 illustrates a network protocol hierarchy structure of a mobile device according to an embodiment of the present invention. First, referring to FIG. 1, the mobile device 10 may have a network protocol hierarchy structure including a network application 110, a software block 120, a socket interface 130, a transmission control protocol (TCP) 140, a user datagram protocol (UDP) 150, an internet protocol (IP) 160, virtual interfaces 170, a network interface 180, a maximum transfer unit (MTU) management unit 190, and a modem device 200. The illustrated network protocol hierarchy structure is an Android or Linux based hierarchy structure, which is, however, provided just by way of example, but aspects of the present invention can also be applied to other operation system based hierarchy structures.

The network application 110 is a top layer of the network protocol hierarchy structure and uses a protocol implemented in service and application programs. The network application 110 performs various application services, such as a browser, a file transfer protocol (FTP), or a hypertext transfer protocol (HTTP).

The software block 120 is the next layer, i.e., the first layer beneath the network application 110, of the network protocol hierarchy structure and is a set of libraries, common development tools, and/or interfaces for implementing standard structures of applications under operation system.

The socket interface 130, the TCP 140, the UDP 150 and the IP 160 may constitute a network protocol unit. First, the socket interface 130 provides application interfacing functions.

The TCP 140 is a protocol for transferring data between systems using different operating systems. The TCP 140 divides data to be transferred into packets. In addition, the TCP 140 includes a header containing destination and source address. In addition, if the data from the IP 160 is erroneously transferred or is not transferred, the TCP 140 re-transfers the data based on the header of the packet.

The packet generated from the TCP 140 is determined in view of a maximum transfer unit (MTU). Here, the MTU is a maximum transfer unit size of data that can be transferred all at once without fragmentation if a frame or a packet is transferred. The MTU may vary according to the type of network interface. In addition, the MTU may be adaptively changed to a smaller value than a network interface MTU value according to the network operation.

Here, the fragmentation may refer to a situation in which a packet larger than the MTU is separated into several packets in a transmission host or an intermediate router to be transferred to a responder side if the packet cannot pass through a data link layer as a single unit, and the separated packets are reassembled after they are received at the responder side. However, if the packet is transferred, fragmentation may not be performed according to the value created in an IP packet header, which is described later. If a packet is larger than the MTU but is not fragmented, the packet may not be transferred. Therefore, in order to achieve packet transfer, the TCP 140 determines the packet based on the MTU data received from the MTU management unit 190.

The UDP (user datagram protocol) 150 is a communication protocol used to unilaterally transfer data from an initiator side without signaling data transfer or reception when the data is exchanged on the internet. Therefore, unlike the TCP 140, the UDP 150 is used when the responder side's receiving data cannot be identified by the initiator side or when it is not necessary for the initiator side to identify whether the data is received by the responder side.

The IP 160 is an internet protocol used when data is transferred from one terminal to another. The IP 160 transfers packets through a network. To this end, the IP 160 additionally includes a header containing routing and destination data in a packet of the TCP 140 or the UDP 150. Here, if a "Don't Fragment" (DF) bit of the IP packet header is set to '1,' fragmentation should not be performed even if fragmentation is not required due to a portion of the network having a small MTU value. If a packet cannot be transferred to a responder side because fragmentation is not performed in response to the DF bit, an internet control message protocol (ICMP) error message is transferred to an initiator side and the corresponding packet is disused. That is to say, if DF is set to '1,' a packet larger than the MTU cannot be transferred.

The IP 160 updates a routing table 161 according to the MTU created by the MTU management unit 190. Here, the routing table may store destination data, network routes from the destination, and network and interface data used for packet transfer. If the destination data for creating multiple MTUs is stored in the routing table, the MTU management unit 190 compares data registered in the routing table 161, registers network data and interface data in the routing table 161 if the destination data is not registered in the routing table or if the destination data is registered in the routing table but the MTU is changed, and generates a new virtual interface 170.

In addition, the IP 160 further includes an internet control message protocol (ICMP) 162 and may share state and error data of an IP network in TCP/IP protocols. The ICMP 162 transfers a message indicating a data transfer error due to various causes, such as a network fault, to the TCP 140 to allow the TCP 140 to re-transfer the packet. If the DF bit of the IP packet header is set to '1,' the packet may not be transferred if the packet is larger than the MTU because the DF bit of 1 prevents fragmentation of the packet. In this case, the ICMP error message may be transferred to the TCP 140 through the virtual interface 170. The ICMP error message may indicate that the DF bit is set to 1, and that the packet is larger than the MTU of at least a portion of the network over which the packet is intended to be transferred; however, aspects need not be limited thereto.

The virtual interface 170 may be disposed between the IP 160 and the network interface 180. The virtual interface 170 may create multiple MTUs. More specifically, if a terminal is simultaneously connected to networks having different MTU values, the virtual interface 170 may be added for each network route. The virtual interface 170 may include a plurality of virtual interfaces 171 and 172. Although two virtual interfaces 171 and 172 are illustrated in FIG. 1, aspects need not be limited thereto such that the virtual interface 170 may include only one or more than two virtual interfaces according to a number of network connections and/or MTU values.

For example, if the network interface 180 of a terminal is an Ethernet, the MTU is set to 1500 bytes. If the MTU of a newly added network route is smaller than the 1500 byte MTU of the network interface 180 (for example, 1400 bytes), a new virtual interface 171 having an MTU of 1400 bytes is generated. In addition, if the MTU of a newly added network route is smaller than the MTU of the network interface 180 (for example, 1200 bytes), a new virtual interface 172 having an MTU of 1200 bytes is generated. The newly added network data is stored in the routing table 161.

Thereafter, the packets input through the virtual interface 170 are bypassed to the network interface 180 without additional processes.

The mobile device 10 can create multiple MTUs without changing the MTU of the network interface 180 if the MTU of a newly added network route is smaller than the determined MTU of the network interface 180. Therefore, for the newly added network route, packets are generated and transferred through the virtual interface 170, thereby solving problems such as a transfer failure occurring when the size of a packet is larger than the MTU but the packet cannot be fragmented or a reduction in the communication speed over the other networks due to the small MTU value of a particular network.

The network interface 180 interworks with the modem device 200. The modem device 200 transfers packets to an external network. The MTU of the network interface 180 may be set to the maximum value that is allowed for a device. For example, if the network interface 180 is an Ethernet, the MTU may be set to 1500 bytes.

The MTU management unit 190 may determine whether the newly added network route is registered in the routing table 161, and, if the newly added network route is registered in the routing table 161, may generate the virtual interface 170 and update the routing table 161 according to whether the MTU is the same as that registered in the routing table 161.

Figure 2:
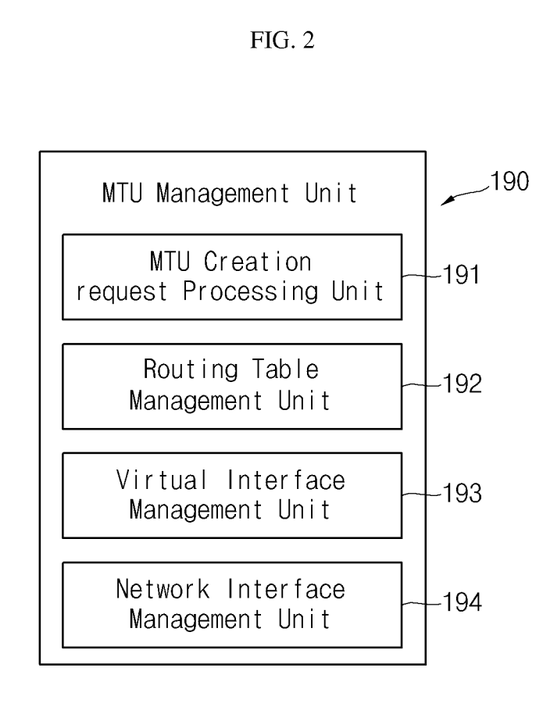
FIG. 2 illustrates a maximum transfer unit (MTU) management unit of a mobile device according to exemplary embodiments of the present invention.

FIG. 2 illustrates a maximum transfer unit (MTU) management unit of a mobile device according to exemplary embodiments of the present invention. Referring to FIGS. 1 and 2, the MTU management unit 190 may include an MTU creation request processing unit 191, a routing table management unit 192, a virtual interface management unit 193, and a network interface management unit 194.

The MTU creation request processing unit 191 identifies the MTU of the network route, and receives an MTU creation request from an application or system module. The MTU creation request may be received from the application or system module when the MTU is actually created. The MTU creation request processing unit 191 determines whether the MTU creation request is normal, abnormal, or a redundant request. The MTU creation request processing unit 191 compares the MTU and destination data of a network with data stored in the routing table 161 and determines whether to generate the virtual interface 170.

The routing table management unit 192 manages registering network data of the virtual interface 170 in the routing table 161 and/or deleting network data of the virtual interface 170 from the routing table 161. In addition, the routing table management unit 192 updates the routing table 161 by storing a changed MTU in the routing table 161 if a newly added network is previously registered in the routing table 161 but the network's MTU is changed from the previous registration of the network.

The virtual interface management unit 193 creates the MTU and network data requested through the MTU creation request processing unit 191 for the virtual interface 170.

The network interface management unit 194 creates the MTU and network data for the actual the network interface 180.

Referring again to FIG. 1, the modem device 200 receives packets from the network interface 180 and transfers the same. The modem device 200 may include both wired and wireless communications. In a wireless communication, the packet transfer may be performed using a synchronous or asynchronous communication network. Further, the wired communication network or wireless communication network may include wired/wireless internet connections, communication via the third generation mobile communication network (3G), communication via the fourth generation mobile communication network (4G), Wi-Fi, and the like).

Figure 3:
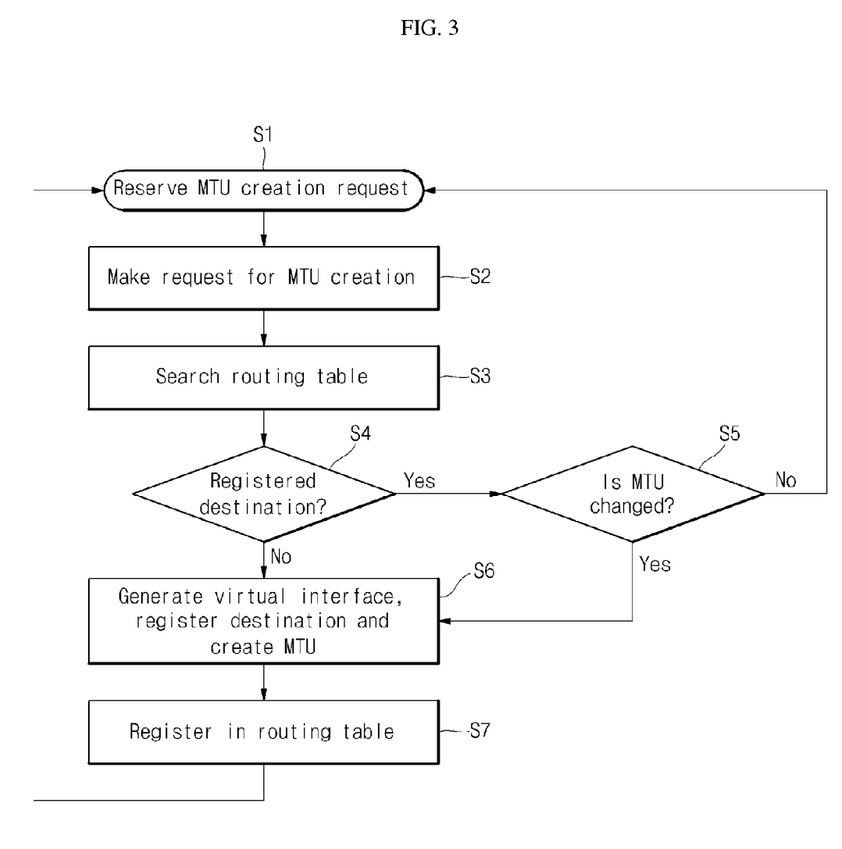
FIG. 3 is a flowchart illustrating an operation of the MTU management unit of a mobile device according to exemplary embodiments of the present invention.

The operation of the MTU management unit 190 will now be described in more detail. FIG. 3 is a flowchart illustrating an operation of the MTU management unit of a mobile device according to exemplary embodiments of the present invention. Although features are described with respect to the features of FIG. 1 and FIG. 2, aspects need not be limited thereto. Referring to FIG. 3, in an MTU creation reserved state of operation S1, if a new network is added, the MTU creation request processing unit 191 makes a request to create an MTU in operation S2.

In operation S3, the routing table management unit 192 searches the routing table 161 to compare a destination and MTU data of the newly added network.

If the destination of the newly added network is registered in the routing table 161 as determined in operation S4, the routing table management unit 192 checks whether an MTU value is changed in operation S5. If the MTU value is not changed, it is not necessary to update the routing table 161 and the MTU creation request reserved state of operation S1 is maintained.

However, if the destination of the newly added network is registered in the routing table 161 but the MTU value is changed as determined in operation S5, or if the destination of the newly added network is not registered in the routing table 161 as determined in operation S4, the virtual interface management unit 193 generates the virtual interface 170 to create a destination address and a MTU value in operation S6.

In operation S7, the routing table management unit 192 stores the destination address and the MTU value created at the virtual interface 170 in the routing table 161. Therefore, if the network is re-connected in a subsequent step, it may not be necessary to repeatedly perform the operation of creating the virtual interface 170.

As described above, the mobile device 10 may create multiple MTUs through the virtual interface 170 without changing the MTU of the network interface 180 if the MTU of a newly added network route is smaller than the determined MTU of the network interface 180. For over the corresponding network route, packets are generated and transferred through the virtual interface 170, so that it is not necessary to change the MTU of another network. Therefore, it may be possible to solve the problems, including a transfer failure occurring when the size of a packet is larger than the MTU but the packet cannot be fragmented or a reduction in the communication speed over the other networks due to the small MTU value of a particular network.

Hereinafter, a data transferring method of a mobile device according to exemplary embodiments of the present invention will be described.

Figure 4:
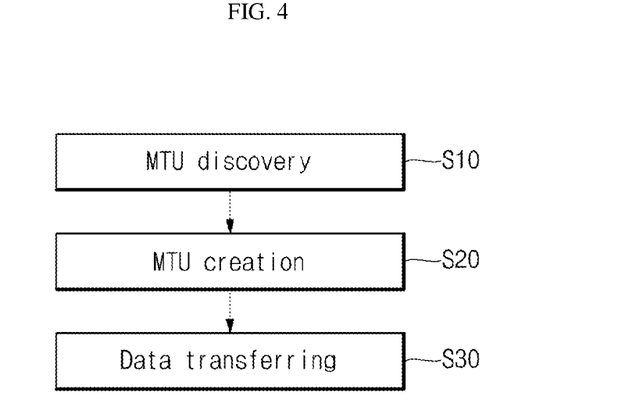
FIG. 4 is a flowchart illustrating a data transferring method of a mobile device according to exemplary embodiments of the present invention.

FIG. 4 is a flowchart illustrating a data transferring method of a mobile device according to exemplary embodiments of the present invention. First, referring to FIG. 4, the data transferring method of a mobile device may include an MTU discovery operation S10, an MTU creating operation S20, and a data transferring operation S30, which will be described with reference to FIGS. 5 to 8.

Figure 5:
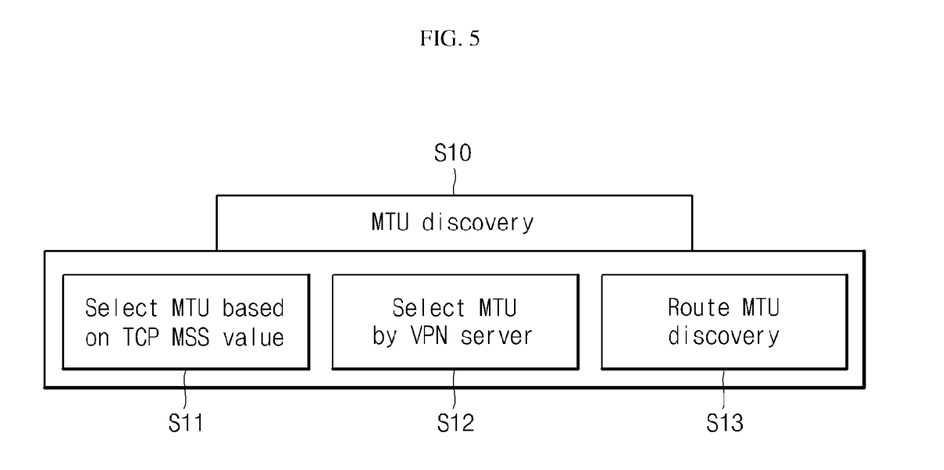
FIG. 5 illustrates a method of performing MTU discovery in a data transferring method according to exemplary embodiments of the present invention.

FIG. 5 illustrates a method of performing MTU discovery in a data transferring method according to exemplary embodiments of the present invention. Referring to FIGS. 4 and 5, in the MTU discovery operation S10, an MTU for a network route is searched in various manners. The operations S11, S12, and S13 may be performed in any sequence.

In operation S11, an MTU may be created or selected according to a maximum segment size (MSS) in the TCP connection. Here, the MSS is a maximum size of a data packet generated in the TCP 140. The MSS is set to the smallest value among MSS values exchanged during TCP connection. The overall MTU value may be determined by adding sizes of TCP header and IP header to the MSS value.

In operation S12, an MTU may be searched or selected according to a security connection of secure sockets layer virtual private network (SSL VPN) and internet protocol security (IPSec VPN). Here, the SSL is a security solution, which can protect content of information by encrypting information in communication between a web browser and server even if an information leak occurs. SSL VPN is an SSL based VPN technology that provides internal network access capability, irrespective of the type of terminal. In SSL VPN, the overall MTU value is determined by adding the TCP header and IP header sizes based on the MSS of TCP associated in establishment of SSL session.

Figure 6:
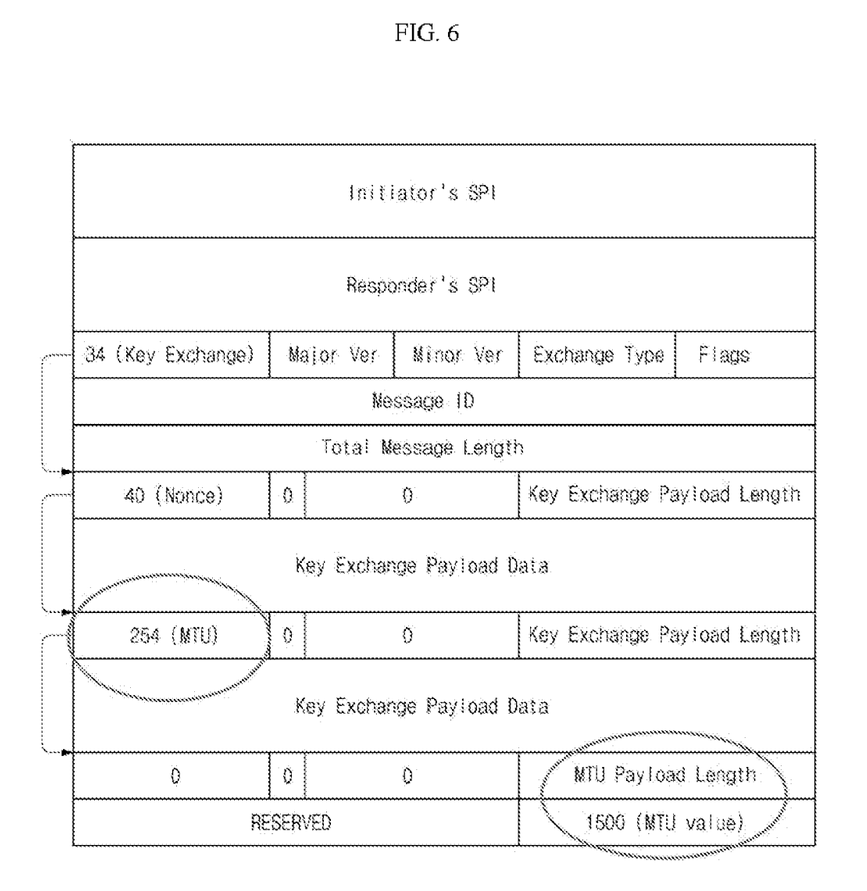
FIG. 6 illustrates an example of selecting the MTU discovery by a VPN server in a data transferring method according to exemplary embodiments of the present invention.

IPSec is a collection of protocols for guaranteeing secure, encrypted communications and provides traffic protection through data encryption and signature. IPSec VPN is IPSec based VPN. In IPSec VPN, MTU attributes are added using an internet key exchange (IKE) protocol during security key association to obtain mutual MTUs, and the smaller value is used as the MTU. FIG. 6 illustrates an example of selecting the MTU discovery by a VPN server in a data transferring method according to exemplary embodiments of the present invention. FIG. 6 illustrates an exemplary message used for IKE. A general payload following after a basic header may have a value determined according to the type of a subsequent payload. A privately allocated value ranging from 128 to 255 may be used in the MTU. The payload may be an actual data portion in a packet except for header data. FIG. 6 illustrates an exemplary MTU value being '254'. In the second payload of FIG. 6, it is notified using the next payload type that the 'MTU' value is '254'. In the last payload of FIG. 6, the MTU value is '1500'. Therefore, the MTU of the network can be determined based on the MTU value identified as '1500' in the message of FIG. 6.

Returning to FIG. 5, in operation S13, the route MTU discovery may be used. Packets may be transferred to the destination while increasing the packet size, thereby determining the MTU as the maximum size of packet transferred. In more detail, in the MTU discovery, a DF bit of the IP header is set to '1' and the packet is transferred. If a packet size is larger than the MTU of the network route, the router of the corresponding network receives an ICMP error message. In the ICMP error message, the type is 3 (Destination Unreachable) indicating that the destination cannot be reachable, and the code is 4 (Fragmentation and DF flag Setting Required) meaning that fragmentation and DF flag setting are required. The MTU of the corresponding network is included in the ICMP error message. The initiator side, having received the ICMP error message, may generate a packet having a size corresponding to MTU in the message again and performs data retransfer. According to this method, the largest MTU in which the packet can be normally transferred can be determined.

Figure 7:
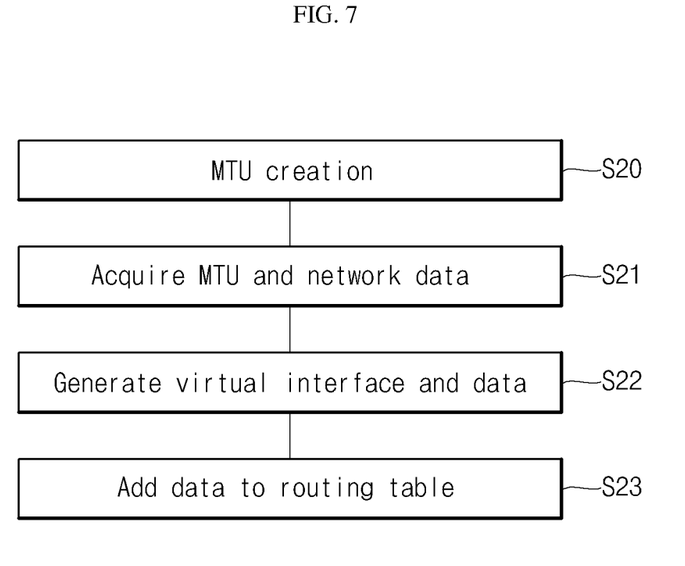
FIG. 7 illustrates detailed steps of creating MTUs in a data transferring method according to exemplary embodiments of the present invention.

FIG. 7 illustrates detailed steps of creating MTUs in a data transferring method according to exemplary embodiments of the present invention. Referring to FIGS. 4 and 7, the MTU creating operation S20 includes acquiring the MTU and network data operation S21. Accordingly, the MTU and network data searched in the MTU discovery operation S10 are transferred to the MTU management unit 190.

The MTU management unit 190 generates the virtual interface 170 and assigns the MTU and network data to the virtual interface 170 according to whether the destination of the corresponding network is registered and whether the MTU value is changed in operation S22.

In operation S23, the MTU management unit 190 stores the MTU and network data in the routing table 161.

Figure 8:
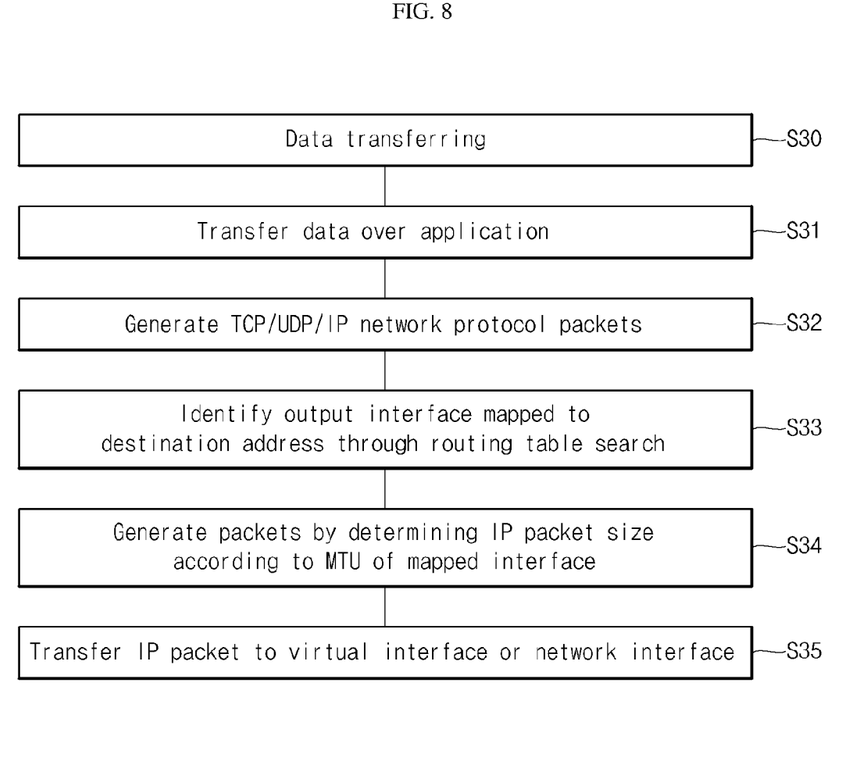
FIG. 8 illustrates detailed steps of performing data transfer in a data transferring method according to exemplary embodiments of the present invention.

FIG. 8 illustrates detailed steps of performing data transfer in a data transferring method according to exemplary embodiments of the present invention. Referring to FIGS. 4 and 8, the data transferring operation S30 includes transferring data packets to the network interface 180 through the virtual interface 170 or directly to the network interface 180.

In the data transferring operation S30, data is first transferred from the network application 110 in operation S31, and protocol packets of the TCP 140, the UDP 150 and the IP 160 are generated in the data in operation S32. In operation S32, headers corresponding to the TCP 140, the UDP 150 and the IP 160 are added to form data packets.

In operation S33, the IP 160 searches the routing table 161 to identify an output interface corresponding to the destination address, and IP packet size is determined and generated according to the determined the MTU of the mapped interface in operation S34.

In operation S35, the IP packet is transferred to the network interface 180 through the virtual interface 170 or directly to the network interface 180 to transfer the data to the destination.

As described above, in the data transferring method of a mobile device according to exemplary embodiments of the present invention, a virtual interface corresponding to a network is generated to create multiple MTUs.

Although the mobile device and the data transfer method using the same according to exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. A method for transferring data for a mobile device, the method comprising:
   determining whether a network is registered with the mobile device;
   if the network is not registered in the mobile device, generating a virtual interface to register a maximum transfer unit (MTU) value of the network, the virtual interface being dedicated to the network, the network comprising a first network having a first MTU value and a second network having a second MTU value; and registering the network by storing the MTU value of the network in the mobile device, wherein:
a first virtual interface is generated to have the first MTU value of the first network;
the first MTU value is registered in a routing table;
a second virtual interface is generated to have the second MTU value of the second network;
the second MTU value is registered in the routing table;
another virtual interface for the first network is generated in response to determining that an identified MTU value of the first network is different from the first MTU value; and
another virtual interface for the second network is generated in response to determining that an identified MTU value of the second network is different from the second MTU value.

2. The method of claim 1, further comprising:
if the network is registered in the mobile device, determining whether a stored MTU value of the network is different from a current MTU value of the registered network.

3. The method of claim 2, wherein, if the current MTU value of the registered network is different from the stored MTU value of the network, generating a virtual interface to generate an MTU value of the registered network.

4. The method of claim 1, further comprising determining an MTU value of the network interface of the mobile device, and
if the MTU value of the connected network is smaller than the determined MTU value of the network interface, generating a virtual interface having an MTU value corresponding to the MTU value of the connected network.

5. The method of claim 1, wherein the generation of the MTU value of the network comprises:
generating the MTU value of the network according to a maximum segment size (MSS) in a transmission control protocol (TCP) connection.

6. The method of claim 1, wherein the generation of the MTU value of the network comprises:
generating the MTU value of the network according to a secure connection of virtual private network (VPN).

7. The method of claim 6, wherein the secure connection is encrypted according to at least one of secure sockets layer, transport layer security, and IPSec protocols.

8. The method of claim 1, wherein the generation of the MTU value of the network comprises:
transferring packets of different sizes to the destination to determine a maximum size of packet successfully transferred.

9. The method of claim 1, wherein the destination address and the MTU value of the network are stored in a router table.

10. The method of claim 1, further comprising:
determining whether a second network is registered with the mobile device; and
if the second network is not registered in the mobile device, generating a second virtual interface to generate an MTU value of the second network.

11. A mobile device, comprising:
a network interface; and
a maximum transfer unit (MTU) management unit configured to determine whether a network is registered with the mobile device, and, if the network is not registered in the mobile device, to generate a virtual interface to register an MTU value of the network, the virtual interface being dedicated to the network, wherein:
the network comprises a first network having a first MTU value and a second network having a second MTU value;
the MTU management unit is configured to generate a first virtual interface to have the first MTU value of the first network, to register the first MTU value in a routing table, to generate a second virtual interface to have the second MTU value of the second network, and to register the second MTU value in the routing table; and
the MTU management unit is configured to generate another virtual interface for the first network in response to determining that an identified MTU value of the first network is different from the first MTU value, and to generate another virtual interface for the second network in response to determining that an identified MTU value of the second network is different from the second MTU value.

12. The mobile device of claim 11, wherein the MTU management unit is further configured to register the network in the mobile device by storing the MTU value of the network in the mobile device.

13. The mobile device of claim 11, further comprising:
a network interface connected to a modem device to transfer the packet data according to the MTU value of the network,
wherein the virtual interface delivers packets to the network interface according to the MTU value of the network.

14. The mobile device of claim 11, wherein, if a second network is connected to the mobile device, the MTU management unit determines whether the second network is registered with the mobile device, and, if the second network is not registered in the mobile device, generates a second virtual interface to generate an MTU value of the second network.

15. The mobile device of claim 11, wherein, if the network is registered in the mobile device, the MTU management unit determines whether a stored MTU value of the network is different from a current MTU value of the registered network.

16. The mobile device of claim 15, wherein, if the current MTU value of the registered network is different from the stored MTU value of the network, the MTU management unit generates a virtual interface to generate an MTU value of the network.

17. A method for transferring data for a mobile device, the method comprising
in response to a connection of a network to the mobile device, determining whether the network is registered in a routing table, the network comprising a first network having a first MTU value and a second network having a second MTU value;
if the network is registered in the routing table, determining whether a stored MTU value of the registered network is different from a current MTU value of the registered network; and
if the current MTU value of the registered network is different from the stored MTU value of the network, generating a virtual interface to generate an MTU value of the registered network, and registering the network by storing the generated MTU value in the routing table, wherein:

a first virtual interface is generated to have the first MTU value of the first network;

the first MTU value is registered in a routing table;

a second virtual interface is generated to have the second MTU value of the second network;

the second MTU value is registered in the routing table;

another virtual interface for the first network is generated in response to determining that an identified MTU value of the first network is different from the first MTU value; and another virtual interface for the second network is generated in response to determining that an identified MTU value of the second network is different from the second MTU value.

18. The method of claim 17, wherein, if the current MTU value of the registered network is the same as the stored MTU value of the registered network, maintaining an MTU creation request reserved state.

19. The method of claim 17, further comprising:

in response to a connection of the mobile device to a second network, determining whether the second network is registered in the routing table; and if the second network is not registered in the mobile device, generating a second virtual interface to generate an MTU value of the second network.

* * * * *